(12) United States Patent
Wobben

(10) Patent No.: US 7,482,707 B2
(45) Date of Patent: Jan. 27, 2009

(54) METHOD FOR THE ERECTION OF A WIND ENERGY PLANT, AND WIND ENERGY PLANT

(76) Inventor: Aloys Wobben, Argerstrasse 19, D-26607 Aurich (DE)

( * ) Notice: Subject to any disclaimer, the term of this patent is extended or adjusted under 35 U.S.C. 154(b) by 0 days.

(21) Appl. No.: 11/713,382

(22) Filed: Mar. 2, 2007

(65) Prior Publication Data

US 2007/0187956 A1     Aug. 16, 2007

Related U.S. Application Data

(62) Division of application No. 10/543,020, filed as application No. PCT/EP2004/000918 on Feb. 2, 2004.

(30) Foreign Application Priority Data

Feb. 1, 2003    (DE)    ................................ 103 04 026
Mar. 6, 2003    (DE)    ................................ 103 10 036

(51) Int. Cl.
    *F03D 9/00*      (2006.01)
    *H02P 9/04*      (2006.01)
(52) U.S. Cl. .......................................... 290/44; 290/55
(58) Field of Classification Search ................... 290/44, 290/55, 43; 416/132 B, 7; 60/398; 415/7, 415/2.1, 4.2, 907, 905
    See application file for complete search history.

(56) References Cited

U.S. PATENT DOCUMENTS

| | | | |
|---|---|---|---|
| 1,415,645 A | 5/1922 | Holterud | |
| 1,633,460 A | 6/1927 | Silvestrin | |
| 2,106,557 A | 1/1938 | Putnam | |
| 2,417,022 A | 3/1947 | Stagg | |
| 3,891,899 A | 6/1975 | Sparling | |
| 3,912,937 A * | 10/1975 | Lesser | ........................ 290/43 |
| 3,921,355 A | 11/1975 | Pennecot | |
| 3,942,026 A | 3/1976 | Carter | |
| 3,944,839 A | 3/1976 | Carter | |
| 4,012,163 A | 3/1977 | Baumgartner et al. | |
| 4,017,698 A * | 4/1977 | Kuhn et al. | .............. 200/50.21 |

(Continued)

FOREIGN PATENT DOCUMENTS

AT              191 530           8/1957

(Continued)

OTHER PUBLICATIONS

Fotos der E3 in Lichterfelde, Feb. 2000, pp. 1-4 (see IDS submitted by applicant).*

(Continued)

*Primary Examiner*—J. Gonzalez
(74) *Attorney, Agent, or Firm*—Neil S. Steinberg

(57) ABSTRACT

A wind power installation, according to one aspect, comprising a pylon which is secured to a foundation, a generator, a container, wherein the container is disposed within the pylon, and a transformer to transform electrical energy provided by the generator to a higher voltage, the transformer disposed in the container. The wind power installation further including a sensor to generate data which is representative of the salt content in air within the pylon and/or within the container and circuitry to provide data which is representative of the salt content to a remote location.

20 Claims, 13 Drawing Sheets

U.S. PATENT DOCUMENTS

| | | | |
|---|---|---|---|
| 4,066,911 A | | 1/1978 | Sarchet |
| 4,068,131 A | | 1/1978 | Jacobs et al. |
| 4,228,363 A | | 10/1980 | Jacobs et al. |
| 4,272,929 A | | 6/1981 | Hanson |
| 4,291,233 A | | 9/1981 | Kirshbaum |
| 4,340,822 A | | 7/1982 | Gregg |
| 4,406,094 A | | 9/1983 | Hempel et al. |
| 4,449,053 A | | 5/1984 | Kutcher |
| 4,565,929 A | | 1/1986 | Baskin et al. |
| 4,609,827 A | * | 9/1986 | Nepple .................. 290/44 |
| 4,673,822 A | | 6/1987 | Kikuchi |
| 4,772,999 A | | 9/1988 | Fiorina et al. |
| 4,873,028 A | | 10/1989 | Garrish |
| 5,075,564 A | | 12/1991 | Hickey |
| 5,140,856 A | | 8/1992 | Larsen |
| 5,285,112 A | | 2/1994 | Mann |
| 5,487,849 A | | 1/1996 | Curtis |
| 5,499,482 A | * | 3/1996 | Goff .................. 52/742.13 |
| 5,845,230 A | | 12/1998 | Lamberson |
| 6,173,537 B1 | | 1/2001 | Davidsson et al. |
| 6,191,496 B1 | | 2/2001 | Elder |
| 6,270,308 B1 | | 8/2001 | Groppel |
| 6,400,039 B1 | | 6/2002 | Wobben |
| 6,407,900 B1 | | 6/2002 | Shirakawa et al. |
| 6,425,708 B1 | | 7/2002 | Siegfriedsen |
| 6,439,832 B1 | * | 8/2002 | Siegfriedsen .............. 415/4.3 |
| 6,448,669 B1 | | 9/2002 | Elder |
| 6,470,645 B1 | | 10/2002 | Maliszewski et al. |
| 6,661,113 B1 | | 12/2003 | Bonin |
| 6,665,990 B1 | | 12/2003 | Cody et al. |
| 6,672,023 B2 | | 1/2004 | Henderson |
| 6,676,122 B1 | | 1/2004 | Wobben |
| 6,688,842 B2 | | 2/2004 | Boatner |
| 6,702,522 B2 | | 3/2004 | Silber |
| 6,710,468 B1 | | 3/2004 | Marrero O'Shanahan |
| 6,713,891 B2 | | 3/2004 | Kirkegaard et al. |
| 6,734,576 B2 | | 5/2004 | Pacheco |
| 6,766,643 B2 | | 7/2004 | Christensen |
| 6,782,667 B2 | | 8/2004 | Henderson |
| 6,785,637 B1 | | 8/2004 | Wobben |
| 6,798,082 B1 | | 9/2004 | Chen |
| 6,841,894 B2 | | 1/2005 | Gomez et al. |
| 6,946,751 B2 | | 9/2005 | Yoshida et al. |
| 7,057,305 B2 | | 6/2006 | Kruger-Gotzmann et al. |
| 7,066,709 B2 | | 6/2006 | Kim et al. |
| 7,137,225 B2 | | 11/2006 | Zuppan |
| 7,155,875 B2 | | 1/2007 | Henderson |
| 7,171,787 B2 | | 2/2007 | Thomason et al. |
| 7,178,298 B1 | | 2/2007 | Ebeling |
| 7,178,406 B2 | | 2/2007 | Gonzalez et al. |
| 7,185,467 B2 | | 3/2007 | Marty |
| 7,230,347 B2 | * | 6/2007 | Brown et al. .................. 290/55 |
| 2004/0131467 A1 | | 7/2004 | Wobben |
| 2006/0013689 A1 | | 1/2006 | Wobben |

FOREIGN PATENT DOCUMENTS

| | | |
|---|---|---|
| DE | 15 09 511 | 8/1979 |
| DE | 37 32 670 | 4/1989 |
| DE | 94 17 738 | 12/1994 |
| DE | 94 17 738.4 | 2/1995 |
| DE | 42 41 952 C2 | 3/1996 |
| DE | 295 18 899 | 1/1997 |
| DE | 198 59 628 | 12/1998 |
| DE | 198 21 592 A1 | 1/1999 |
| DE | 198 16 483 A1 | 10/1999 |
| DE | 198 60 211 | 11/2000 |
| DE | 201 02 051 | 6/2001 |
| DE | 199 62 453 | 7/2001 |
| DE | 100 13 442 | 10/2001 |
| DE | 101 19 429 | 10/2002 |
| DE | 101 45 414 | 5/2003 |
| DK | 97 00453 U3 | 3/1998 |
| DK | 2000 00086 U3 | 5/2000 |
| EP | 0 675 246 | 10/1995 |
| EP | 0 675 246 A1 | 10/1995 |
| EP | 1 389 581 | 7/2003 |
| JP | 360195382 A  * | 10/1985 |
| JP | 61-105768 | 7/1986 |
| JP | 62020678 | 1/1987 |
| JP | 07 122438 | 5/1995 |
| JP | 2000161197 | 6/2000 |
| JP | 2000213451 | 8/2000 |
| JP | 2006240381 | 9/2006 |
| WO | WO 99/30031 | 6/1999 |
| WO | WO 00/39903 | 7/2000 |
| WO | WO 01/06121 A1 | 1/2001 |
| WO | WO 03/025392 | 3/2003 |

OTHER PUBLICATIONS

"Middelgrunden—Danmarks Smukkeste Havemellepark—The Beauty in The Wind", Mads Eskessen, Hans Christian Sorensen et al., Apr. 2001, pp. 1-31, 55-60 (see IDS submitted by applicant).*

"A Feasibility Study on Offshore Wind Turbine Systems", B. Bjork, Wind Engineering, vol. 9, No. 4, 1985, pp. 243-255.*

"Le poste socle dans la mise en souterrain des réseaux ruraux", M. Orlhac, Revue Generale de L'Electricite, RGE, Paris, France, No. 4/93, Apr. 1993, pp. 23-25.

Fotos von der HSW 250 mit der Bau-Nr.: 16 lm "Nordfriesland Windpark" im Friedrich-Wilhelm-Lübcke-Koog vom Feb. 6, 2004.

Eidesstattliche Versicherung von Herrn Hans-Dieter Struck zur Aufstellung der HSW 250 sowie der Bestätigung, dass diese Anlagen so wie sie heute zu besichtigen sind, den ursprünglich errichteten Anlagen entsprechen, no date given.

Informationsblatt zum Nordfriesland Windpark Veröffentlicht: 1991.

Informationsbroschüre zur Nordfriesland Windpark GmbH & Co.KG, herausgegeben von der BVT Beratungs-, Verwaltungs- und Treuhandgesellschaft fur internationale Vermögensanlagen mbH, München, no date given.

"DeWind Strategische Allianz mit Krupp", Wind-Kraft Journal, Sonderausgabe 1997, Seite 84, Verlag Natürliche Energie GmbH, 24811 Brekendorf.

Neue Energie, Nr. 10/Oct. 1998, Uranus Verlagsges mbH, Neustiftgasse 115A/Top20, A-1070 Wien.

"Bonus Info, The Neverending Story", Henrik Stiesdal et al., Winter 1999, pp. 1-2 and 5-9.

Wind-Kraft Journal, Sonderausgabe—Jobs in der Windenergie 2000, Verlag Natürliche Energie GmbH, 24811 Brekendorf.

"Middelgrunden—Danmarks Smukkeste Havmellepark—The Beauty In The Wind", Mads Eskesen, Hans Christian Sorensen et al., Apr. 2001, SPOK ApS, Front page, pp. 1-31 and pp. 55-60.

"The Middelgrunden Offshore Windfarm—A Popular Initiative", Hans Christian Sorensen et al., Copenhagen Environment and Energy Office, Mar. 2003, pp. 1-9, 14-15 and 26-28.

"Middelgrunden Offshore—The Project", Henrik Stiesdal et al., Jul. 1, 2001, pp. 1-14.

"Experience from the Establishment of Middelgrunden 40 MW Offshore Wind Farm", Hans Christian Sorensen et al., 2001 European Wind Energy Conference, Copenhagen, Denmark, Jul. 1-7, 2001.

Windenergieanlage von Typ MD70, Aufstellung der Anlage: 1998, Fotos 1-5 von der offiziellen Vorstellung der ersten MD 70 am Sep. 17, 1998, entwickelt am Sep. 18, 1998 (siehe Bild 1 "Photo-Index").

Windenergieanlage vom Typ MD70, Aufstellung der Anlage: 1998, Artikel von Björn Johnsen in "Erneuerbare Energien" Ausgabe Jul. 1999, "MD 70: 1.500-kW-Mühle mit schlankem Design".

Windenergieanlage vom Typ MD70, Aufstellung der Anlage: 1998, Auflistung der in der Zeit vom 1998 bis Jul. 2001, errichteter MD70-Anlagen.

Fotos 1-7 vom Aufbau der MD 70 mit der Bau-Nr.: 70002-01, Standort Lichterfelde in der Zeiti vom Feb. 9-15, 2000.

Eidesstattliche Versicherung des Herrn Gutmundt Ertel hinsichtlich des Verfahrens zum Aufbau der MD 70 in Lichterfelde, no date given.

"North Sea Offshore Wind—A Powerhouse for Europe, Technical Possibilities and Ecological Considerations", Deutsches Windenergie Institut (DEWI), Greenpease e.V., Oct. 2000, pp. 1-2 and 32-56.

Brochure Illustrating Madfeld Facility, Madfeld, Germany, 1999.

Brochure Illustrating Auma Facility, Auma, Germany, 1999.

OD #1: English translation of Windenergieanlage vom Typ MD70, Aufstellung der Anlage: 1998, Artikel von Björn Johnsen in "Erneuerbare Energien" Ausgabe Jul. 1999, "MD 70: 1.500-kW-Mühle mit schlankem Design".

OD #2: English translation of Windenergieanlage vom Typ MD70, Aufstellung der Anlage: 1998, Auflistung der in der Zeit von 1998 bis Jul. 2001 errichteter MD70-Anlagen.

OD #3: English translation of Fotos 1-7 vom Aufbau der MD 70 mit der Bau-Nr.: 70002-01, Standort Lichterfelde in der Zeiti vom Feb. 9-15, 2000.

OD #4: English translation of Eidesstattliche Versicherung des Herrn Gutmundt Ertel hinsichtlich des Verfahrens zum Aufbau der MD 70 in Lichterfeld, no date provided.

* cited by examiner

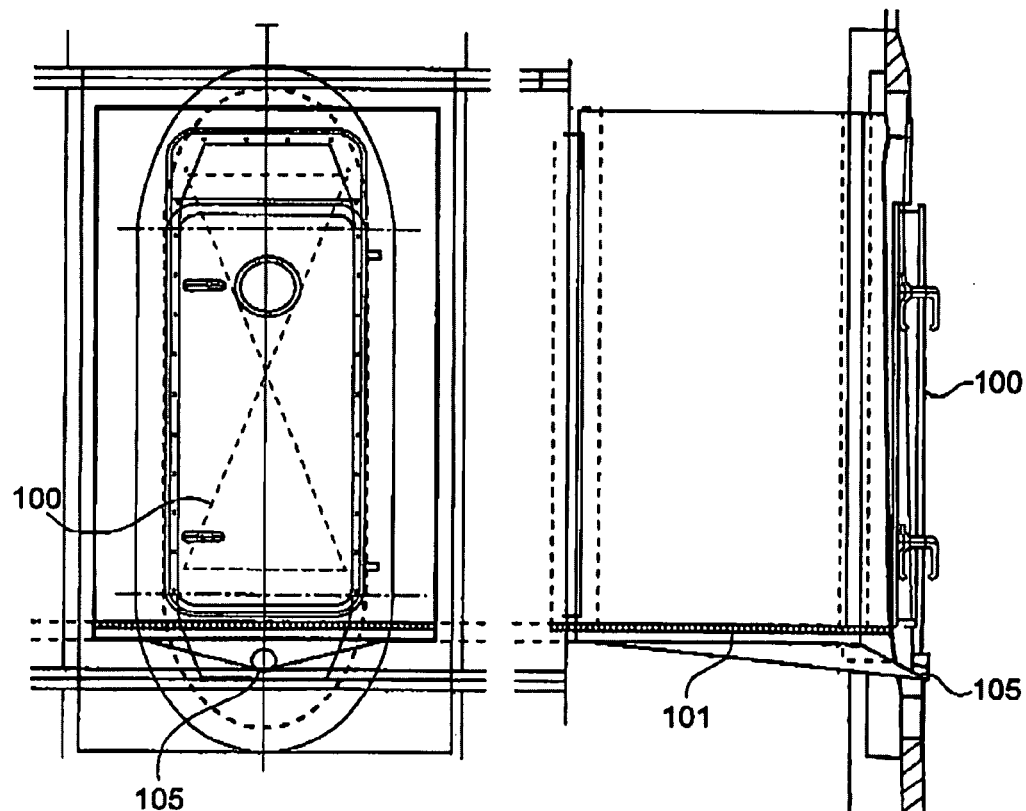
FIGURE 12
FIGURE 14
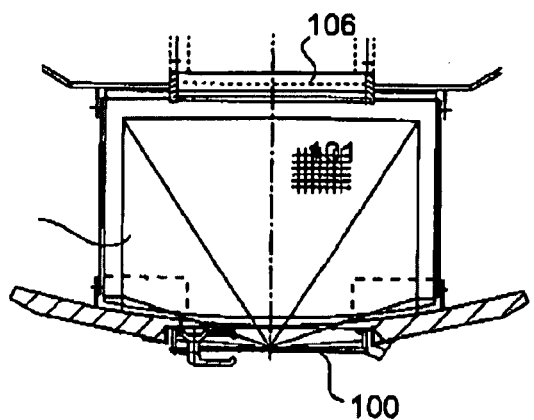
FIGURE 13

METHOD FOR THE ERECTION OF A WIND ENERGY PLANT, AND WIND ENERGY PLANT

RELATED APPLICATIONS

This application is a divisional application of application Ser. No. 10/543,020 (still pending), filed Mar. 29, 2006, which is the National Stage of International Application No. PCT/EP2004/00918, filed on Feb. 2, 2004; both applications claim priority to German Patent Application 103 10 036.9, filed Mar. 6, 2003, and German Patent Application 103 04 026.9, filed Feb. 1, 2003; the contents of these applications are incorporated herein by reference.

TECHNICAL FIELD

The invention concerns a method of erecting a wind power installation and the wind power installation in its configuration itself.

RELATED INFORMATION

Hitherto, when erecting wind power installations, a foundation was firstly constructed, then the pylon of the wind power installation was erected and then the machine housing was fitted at the top of the pylon and the rotor with the rotor blades was mounted in position. Thereafter the electrical power modules such as the transformer, switching cabinets, possibly an inverter, a medium voltage installation and so forth are installed. That is almost always done in a small building specific for that purpose, outside the wind power installation.

DE 198 16 483.1 has already proposed disposing the transformer in the pylon in the interior thereof so that there is no longer any need for the erection of a specific transformer building with its own foundation.

SUMMARY

Now, an object of one aspect of the invention is to develop a method by means of which the erection of wind power installations can be effected still more conveniently but in particular also more quickly.

A further aim of one aspect of the invention is to provide in particular a solution which is suitable for offshore wind power installations.

In accordance with one aspect of the invention it is firstly proposed that the power module is arranged in a container having walls which are disposed between the wall of the pylon and the power module. Accordingly therefore the power module has its own enclosure or is disposed in a separate space within the pylon of the wind power installation. The particular advantage of that structure is that in that way, in a particular fashion, in relation to offshore wind power installations, it is possible to ensure that, when water penetrates into the pylon, the power module and the items of electrical equipment installed therein are not also detrimentally affected at the same time.

If the transformer and the further parts of the power module such as switching installations, inverters and so forth are disposed in a separate space within the wind power installation, it is also relatively simple for those components to be separated from the rest of the ambient air within the pylon of the wind power installation. Under certain circumstances in a wind power installation that can be very important if it is operated as an offshore wind power installation and therefore a certain salt content in the air is not improbable. Enclosing the electrically sensitive parts in a housing means that in principle they can be protected from the salt-bearing internal air within the pylon of the wind power installation, for example by the enclosing housing and the power module also being provided with a personnel-negotiable lock arrangement. If cooling is necessary for the electrical parts within the enclosing housing, then the arrangement can have suitable cooling ducts which lead into the interior of the pylon and for example also extend along the pylon wall and through which air can be introduced here into the cooling ducts (by way of a fan) and then passes in a cooled condition back into the enclosing housing again so that the same air is always circulated within the enclosing housing and that air does not involve the addition thereto of the air, which under some circumstances bears salt, in the rest of the interior of the pylon.

The power module in the container, as a departure from the previous design structure of wind power installations, can already be placed on the foundation of the wind power installation after it has been set up, before the pylon is erected, or the container with the power module is already mounted and fixed within the pylon at the factory so that erection of the wind power installation is also possible without the electrical parts of the offshore wind power installations, which are sensitive to moisture and damp, being detrimentally affected when erecting those installations.

The power modules are as far as possible already prefabricated and mounted on carriers so that, using a crane which is required in any case for erecting a wind power installation, the power modules can be placed on the pylon foundation or a platform and the entire system production procedure, in particular laying cables and the entire system preparation process for the wind power installation by adjusting control modules, setting up the switching cabinets etc can take place in a protected space and it is possible to begin those activities after the pylon has been erected.

It is also particularly advantageous if the supports of the power modules and/or the containers for the power module have at their underside support feet which in turn rest on pre-positioned plates on the pylon foundation. Those plates are already let into and fixed in the foundation when the foundation is produced, at given positions, so that later establishment of the power modules can be effected in a very simple fashion.

Finally it is also highly advantageous if empty tubes are provided for the cables which extend out of the wind power installation, that is to say in particular the power transmission cables, control cables and so forth. Empty tube tie bars are provided for those empty tubes in the foundation of a wind power installation or above the foundation and those empty tube tie bars fix the empty tubes in a defined position. For that purpose the tie bars are held by means of holding arms which in turn are again exactly predetermined in parts of the foundation or at the lower section of the cable feed arrangement and in particular are laid in such a way that the cables which extend out of the power module into the foundation have a standardized, shortest and optimum cable route.

The measures according to one aspect of the invention therefore also already facilitate the entire electrical setup of the wind power installation by prefabrication of individual modules or standardization such as empty tube tie bars, power module supports etc, when establishing the foundation.

The entire erection time of the wind power installation can be markedly reduced with the measures according to one aspect of the invention. In addition, the costs for the entire wind power installation erection procedure can be reduced with one aspect of the invention without having to accept any technical disadvantages.

Aspects of the invention are described in greater detail hereinafter by means of an embodiment illustrated in a drawing.

BRIEF DESCRIPTION OF THE DRAWINGS

FIGS. 12-16 show views of portions of a wind power installation, according to one embodiment of aspects of the invention.

DETAILED DESCRIPTION

Figure 1:
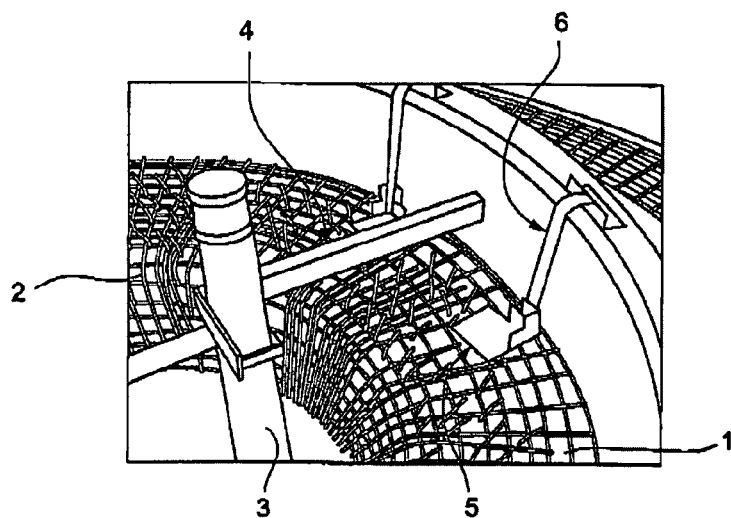
FIG. 1 shows a plan view of a foundation, without concrete filling, and support plates, according to an embodiment of aspects of the invention.

FIG. 1 shows a plan view of a pre-established foundation (without concrete filling) with a steel reinforcement 1 and 2, on an empty tube 3 which is held by way of a strut arrangement 4 to a lowermost pylon section which adjoins the reinforcement. The Figure also shows support plates 5 which are mounted for holding arms 6 in the lowermost section of the pylon (for the major part they are no longer to be seen at a later time after erection of the wind power installation).

The empty tube 3 serves later for receiving cables, for example the power cables, by way of which all the electrical energy from the wind power installation is taken to the network by way of underground cables. For that purpose there is often not just a single tube but a plurality of tubes.

Figure 2:
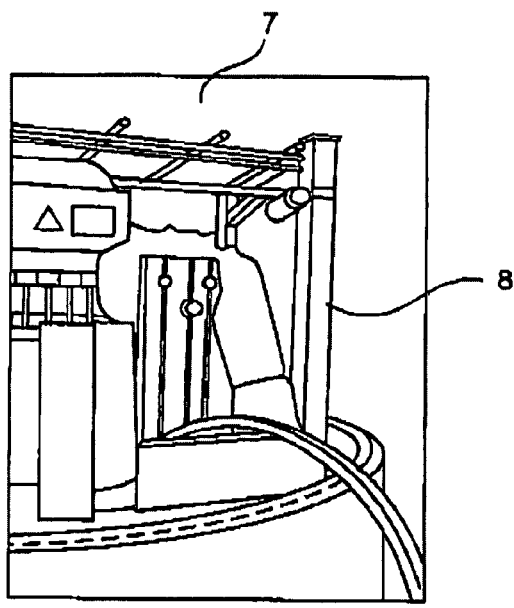
FIG. 2 shows the foundation of FIG. 1 after filling with concrete.

FIG. 2 shows the foundation section after filling with the concrete. It is to be seen in that respect that the empty tubes remain in their pre-fixed position and the support plates are also concreted into position, in which respect, in the concreting operation, care is to be taken to ensure that the support plates rest fully on the structural concrete and thus ensure that the load is carried over an area. The concrete extends to the upper edge of the support plates and is carefully joined to the plate edges.

After the concrete has set, for further erection of the wind power installation, the pylon is not placed on the foundation section—as has hitherto been usual—but firstly the power module according to one embodiment of aspects of the invention is placed on the support plates.

After the concrete has set, for further erection of the wind power installation, the pylon is not placed on the foundation section—as has hitherto been usual—but firstly the power module according to the invention is placed on the support plates.

Figure 3:
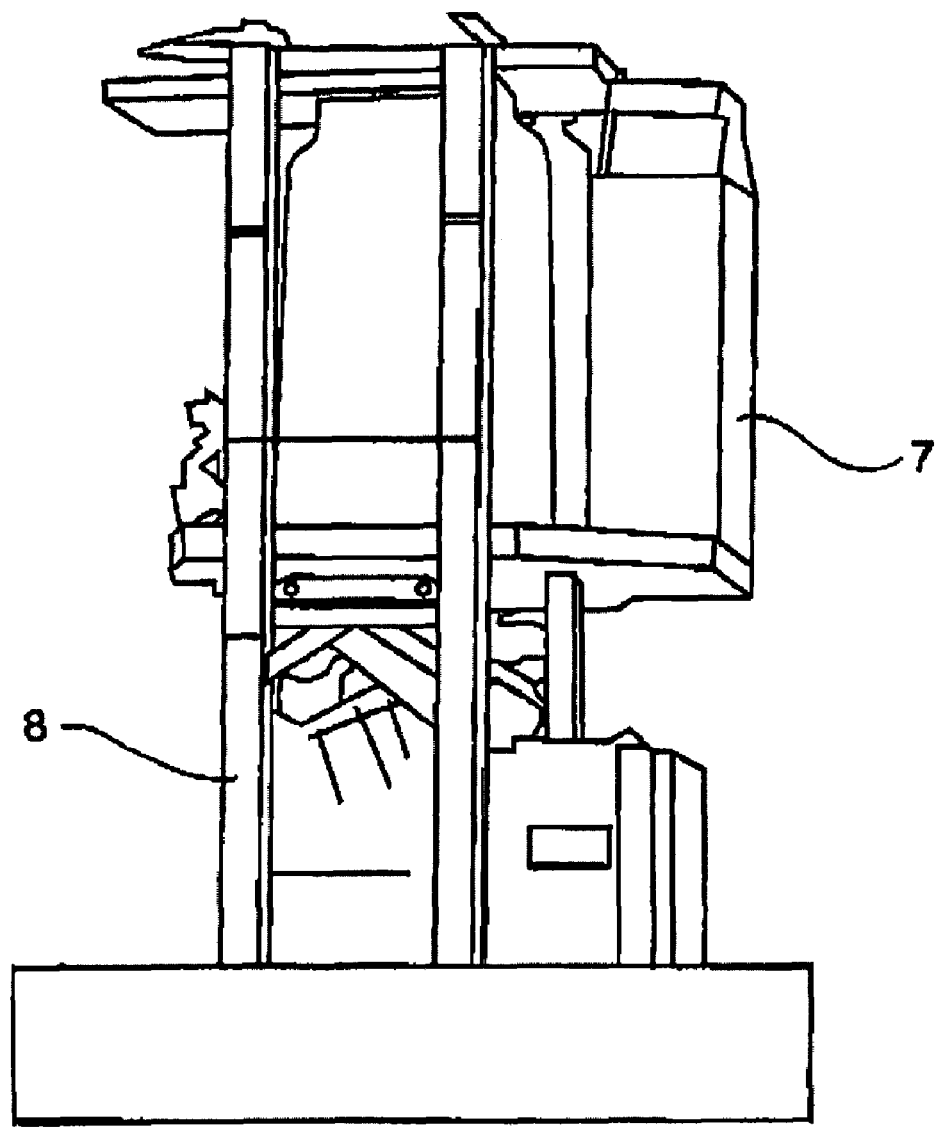
FIG. 3 shows a power module, without its enclosing housing, on the support plates of FIG. 1, according to an embodiment of aspects of the invention.
Figure 4:
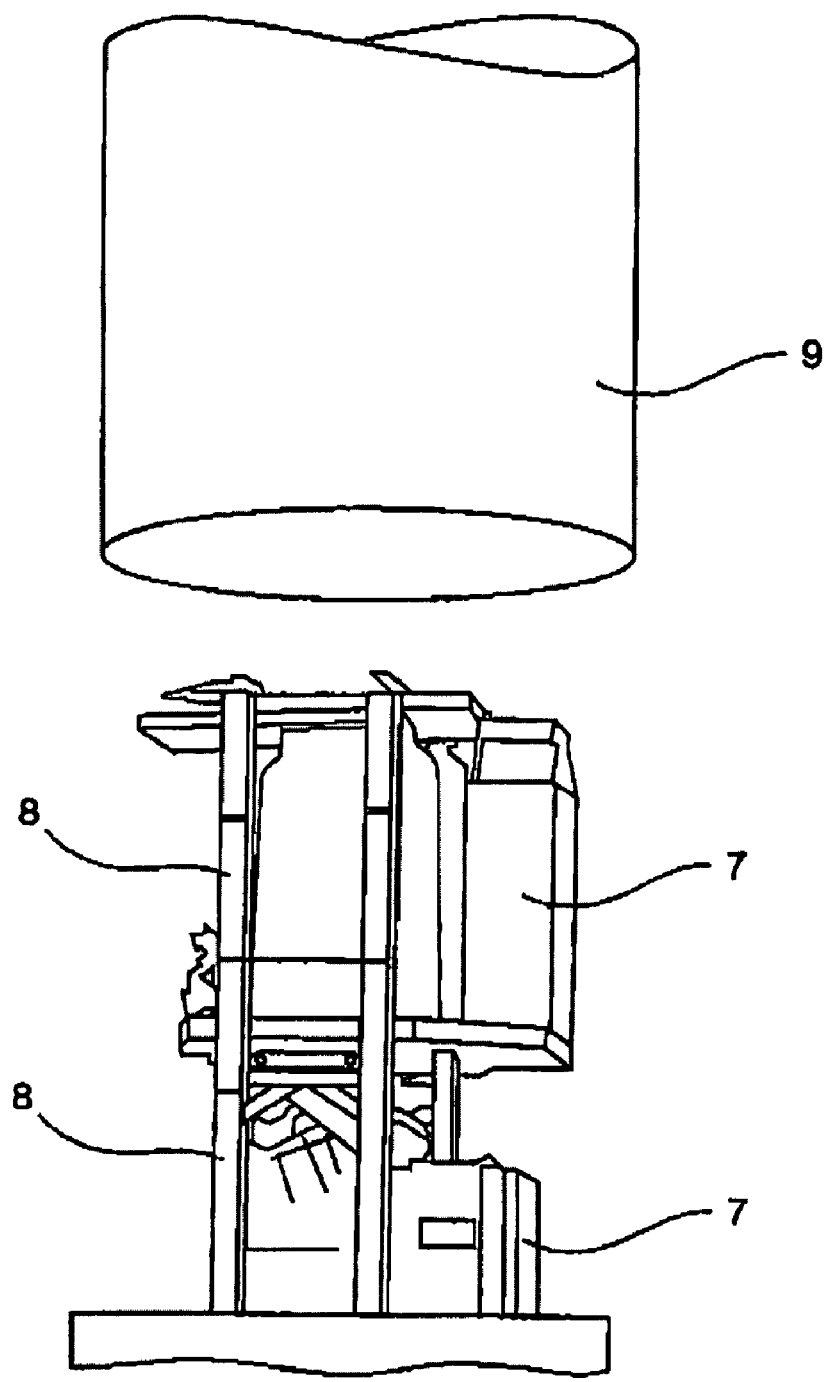
FIG. 4 shows the power module of FIG. 3 and a pylon.

Such a power module 7 is shown in FIG. 3 in a two-part configuration, still without its enclosing housing, in which respect the power module can also comprise further parts.

The two parts of the power module 7 are placed one above the other in the illustrated embodiment and the entire power module comprises two mutually superposed supports 8 which in turn again receive essential parts of the power modules, that is to say for example the transformer, inverter, switching cabinets, medium voltage installation and so forth.

The mutually superposed supports are constructed in the manner of a frame and fit exactly one above the other so that reliable fixing relative to each other is also guaranteed.

The individual supports have inter alia four vertically oriented beam members—defining a rectangle—which are connected together. Those beam members are screwed together at their underside and top side.

After the electrical power module has been set up on the foundation the pylon is erected and in that situation is fitted over the power module. For that purpose the outside dimensions of the power module in terms of breadth and length are less than the inside diameter of the pylon in the lower pylon region/foundation region.

After the pylon has been erected the wind power installation is equipped as usual with the machine housing, the rotor is mounted in place and suitable electrical connections are made between the generator and the power module for bringing the installation into operation and the power module is connected (output of the transformer) to the power supply network.

When the above-described empty tubes or devices provided for carrying cables are pre-fixed in given prescribed positions, the connection between the power module and the network can also be made extremely quickly and advantageously, in which respect the cable lengths overall are optimized because the empty tubes are positioned and thus the cables issue from the foundation, at the location where they are required in the case of a standardized, optimized structural configuration for connection to the corresponding parts of the power module.

In the case of the wind power installation according to one embodiment of aspects of the invention it is advantageous if access to the wind power installation is no longer necessarily through a conventional door in the fixed foundation region but through a door (access) which is so positioned that it opens into the region above the parts of the power module, which are carrying high or medium voltage. For that purpose a suitable ladder or staircase can be provided at the outside of the pylon. That positioning of the access door has the advantage that the personnel who must relatively frequently enter the installation do not always have to move past the parts of the power module, which are carrying voltages, while the installation is in operation. That also ensures that no one is in the immediately proximity of the power module unexpectedly or by mistake while the wind power installation is in operation, and thus comes into contact with voltage-carrying or current-carrying parts, which could cause a serious accident.

Then, provided in the region of the pylon access door is a suitable intermediate platform which the personnel entering the pylon can negotiate in order then to climb further up in the wind power installation in the interior of the pylon or to carry out adjustments at various control devices or also read off measurement data.

A wind power installation of the type according to one embodiment of aspects of the invention involves such an installation which usually has more than 100 kW rated power, preferably a rated power in the region of 500 kW, 1 MW, 1.5 MW or markedly higher. Preferably the intermediate platform is provided with a closable panel through which the personnel can climb into the lower region of the power module. Closure of the flap ensures that the lower part of the power module is further safeguarded against unauthorized access or entry.

In that case the inside diameter of the pylon in the foundation region can be several meters so that the entire area there is for example 100 m2 or more and therefore there is a sufficiently large area for receiving the power modules. Insofar as the term 'power module' is used in this application, that means in particular the converter and network transfer region of the wind power installation. These are in particular the assemblies such as the transformer or inverter or emergency switches as well as the medium voltage switching cabinet or also the distributors.

As mentioned the power module is to be disposed in its own container or space within the wind power installation. That container can comprise a cylindrical tube which, after the power module has been placed on the foundation, is fitted over the entire power module or the power module is already disposed at the factory within the cylindrical tube so that, for transporting the cylindrical tube, the entire power module is transported. The container can in particular also be very substantially closed towards all sides but it is provided with at least one access door and, if the power module is constructed on a plurality of levels within the tube, it is also possible for the various levels of the power module to be reached by way of stairways or ladders within the module.

It is also possible to provide within the container an additional space or room which is available for example as a changing room and/or rest room for people such as service engineers and so forth. That is highly appropriate in particular when an embodiment of aspects of the invention is embodied in relation to offshore wind power installations and in a bad weather situation the engineers are obliged to remain within the wind power installation for a certain time. That room or space should therefore also be provided with the most necessary items which permit a prolonged stay such as for example fresh water, food, sleeping arrangements, communication equipment.

In addition that space or room can perform a lock arrangement function and can be hermetically sealable in relation to the interior of the wind power installation. In that way for example in the case of a fire in the wind power installation people can take refuge there and arrange for and await their rescue.

If the enclosing housing comprises a cylindrical tube, the upper and lower tube ends or further additional openings which are possibly provided can be closed for transport to the building site or the upper and lower tube ends are fixedly closed from the outset so that, even in severe weather, transport to the building site or an interruption in the building activity does not entail the risk of sea water or moisture being able to penetrate into the container and thus reach the electrically sensitive parts of the power module.

If cooling of the power module elements is necessary, the container is also so designed that air exchange between the interior of the power module and the interior of the pylon of the wind power installation is possible. Preferably however only heat dissipation of the waste heat from the power module to the interior of the pylon can occur outside the power module. For that purpose, it is possible to provide a closed air circuit for the power module, which delivers the heat to the interior of the pylon by way of a suitable heat exchanger, for example in the form of a cooling coil.

Figure 7:
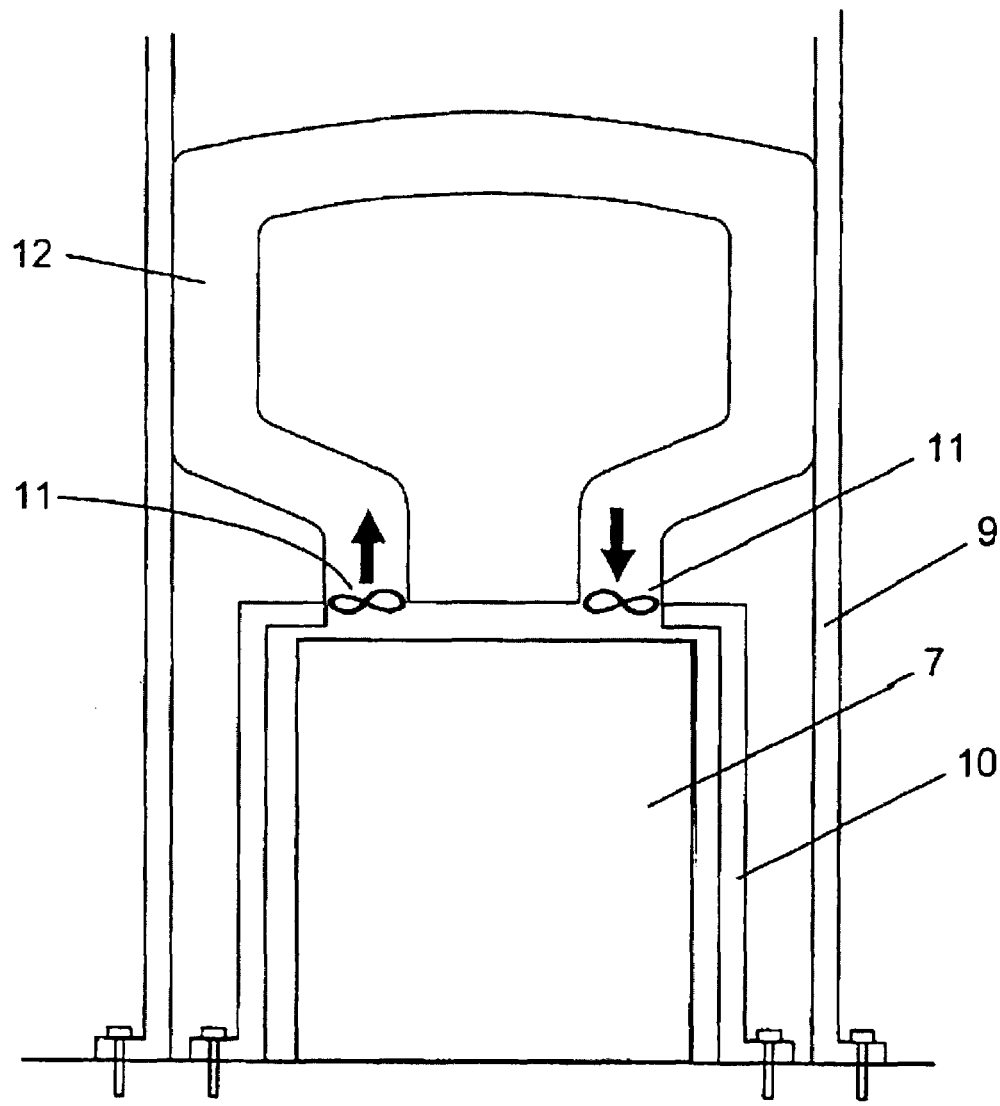
FIG. 7 shows a longitudinal cross section view of a region of the wind power installation of FIG. 5, according to one embodiment of aspects of the invention.

If cooling of the individual elements of the power module is necessary that can also be effected by air being passed from the interior of the enclosing housing by way of air ducts 12—FIG. 7—(air shafts) which on the one hand open into the enclosing housing, and by those air shafts again returning the cooled air back into the enclosing housing at another location. Positive convection of the air within the enclosing housing is to be established by fans at the entry and/or exit of the individual air shafts. If those air ducts (air shafts) are passed directly at the pylon of the wind power installation in contact therewith, for example also being in a spiral configuration in a plurality of layers in mutually superposed relationship, then the air is cooled within the air ducts because the pylon wall itself forms a cooling element which always has air or water flowing around it from the exterior. The above-mentioned variant has the particular advantage that the interior of the enclosing housing is then always separated from the interior of the pylon and, if the wind power installation is an offshore wind power installation, then the interior of the enclosing housing is very certain to be protected from coming into contact with possibly salt-bearing air which has penetrated into the interior of the pylon. This means that all electrical parts of the power module in the interior of the enclosing housing are protected from contact with air which has a very strong attacking effect such as salt-bearing air without measures being absolutely necessary for simultaneously protecting the entire interior of the pylon from the ingress of salt-bearing air.

In the case of a closed enclosing housing for the transformer and the other electronic elements, it is appropriate also to dispose within the enclosing housing a fire protection arrangement which is activated when a fire breaks out there. That fire protection arrangement can for example also provide that the entire arrangement is flooded with an inert gas, for example $CO_2$, so that the oxygen content within the enclosing housing is reduced and thus a possible fire is deprived of the necessary oxygen. Instead of a gas such as $CO_2$ however it is also possible to use a gas such as nitrogen or another inert gas. That inert gas is stored in a tank and is supplied by way of one or more sensors which respond in a fire situation (or at a greatly increased temperature), by way of a valve which closes the tank with the inert gas so that the inert gas can flow very rapidly into the enclosing housing.

Under some circumstances safety devices are provided, for preventing the inert gas being capable of flowing into the enclosing housing when people are disposed therein. Such a safety device can also include for example switching elements which are activated on the part of the operating personnel when entering the enclosing housing so that then the inert gases are prevented from flowing into the enclosing housing.

In the event that nonetheless salt-bearing air should pass into the enclosing housing, it is also advantageous if there are means within the enclosing housing, for removing salt from the air which is present there.

So that as little salt-bearing air as possible can pass into the enclosing housing, it is also advantageous if the enclosing housing is provided with a lock arrangement which is preferably made from a glass fiber reinforced plastic material (GRP). If the operating personnel want to enter the enclosing housing by way of the lock arrangement, air is passed under pressure into the lock arrangement so that the operating personnel can pass into the enclosing housing against an air flow. It is therefore advantageous if the enclosing housing is also connected to a further tank, within which substantially salt-free air is stored which is then passed into the enclosing housing under pressure when operating personnel wish to go into the enclosing housing by way of the lock arrangement.

It is also advantageous if there are within the enclosing housing means which are so adapted as to minimize the moisture content within the enclosing housing. Such a means can be for example a Peltier element.

The means for removing salt from the air and also for reducing the moisture content are possibly activated if corresponding sensors which are responsive to the salt content in the air or the moisture content detect that a given salt value or moisture content value is exceeded. The means for removing salt from the air and also for reducing the moisture content are then activated until the salt content and/or the moisture content has fallen below a predetermined value.

The enclosing housing with the power module enclosed therein can be placed on the foundation of the wind power installation or on a platform within the pylon of the wind power installation. That platform can preferably also be disposed very far up just under the machine housing of the wind power installation in order in that fashion to ensure in the best possible way that as little salt as possible can pass into the enclosing housing, in the case of a wind power installation which is set up as an offshore installation.

It is also advantageous if the data which the sensors for the salt content and/or the moisture content measure are forwarded to a central station in which the entire wind power installation is controlled or monitored. The means for reducing the salt content or for reducing the moisture content within the enclosing housing can be activated by way of the central station.

To prevent the outbreak of a fire in relation to parts of the power module, it is also possible for an atmosphere with a low oxygen content to prevail within the entire enclosing housing, during normal operation. That can be effected for example by oxygen being removed from the air within the enclosing housing so that the oxygen content falls below the normal oxygen content of air. It will be appreciated that it is also possible for a high $CO_2$ content (up to 100%) or nitrogen content (up to 100%) or of another inert gas (from a tank) to be provided in the entire enclosing housing. It is only when the operating personnel wish to enter the enclosing housing that then a normal atmosphere is restored within the enclosing housing so that it is possible to stay therein. In such a case it is appropriate if the lock arrangement is to be opened only when an atmosphere which permits a person to stay within the enclosing housing without breathing equipment is produced within the enclosing housing.

The enclosing housing according to one embodiment of aspects of the invention can be disposed not only within the wind power installation but also mounted to the pylon directly on the outside thereof. That can be effected for example by the entire enclosing housing being mounted on a platform externally on the pylon or fixed directly to the pylon. If the enclosing housing is in the form of a closed tube and if that tube is arranged externally on the pylon then people can enter the enclosing housing by way of a door or lock arrangement to the enclosing housing and the interior of the pylon. With this variant it is also readily possible for the interior of the enclosing housing to be cooled by way of air ducts which extend into or surround the pylon, without the outside air which surrounds the wind power installation coming into contact with the air within the enclosing housing.

It is also advantageous if the enclosing housing is of a multi-part configuration so that for example when replacing an individual part of the power module it is not necessary to remove the entire enclosing housing but only the module part of the enclosing housing, which directly surrounds the part of the power module that has to be replaced.

Figure 5:
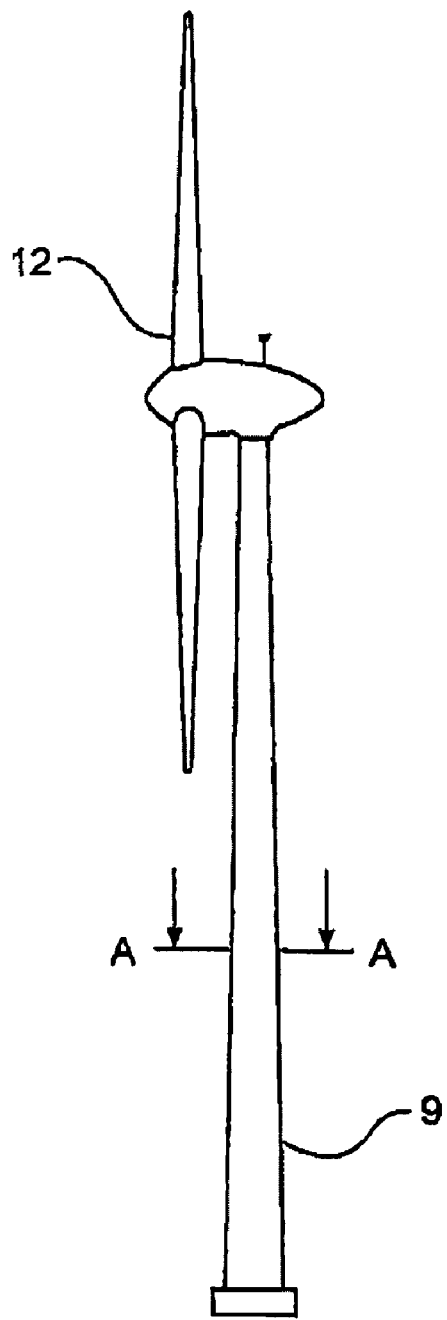
FIG. 5 shows a side view of a wind power installation, according to an embodiment of aspects of the invention.
Figure 6:
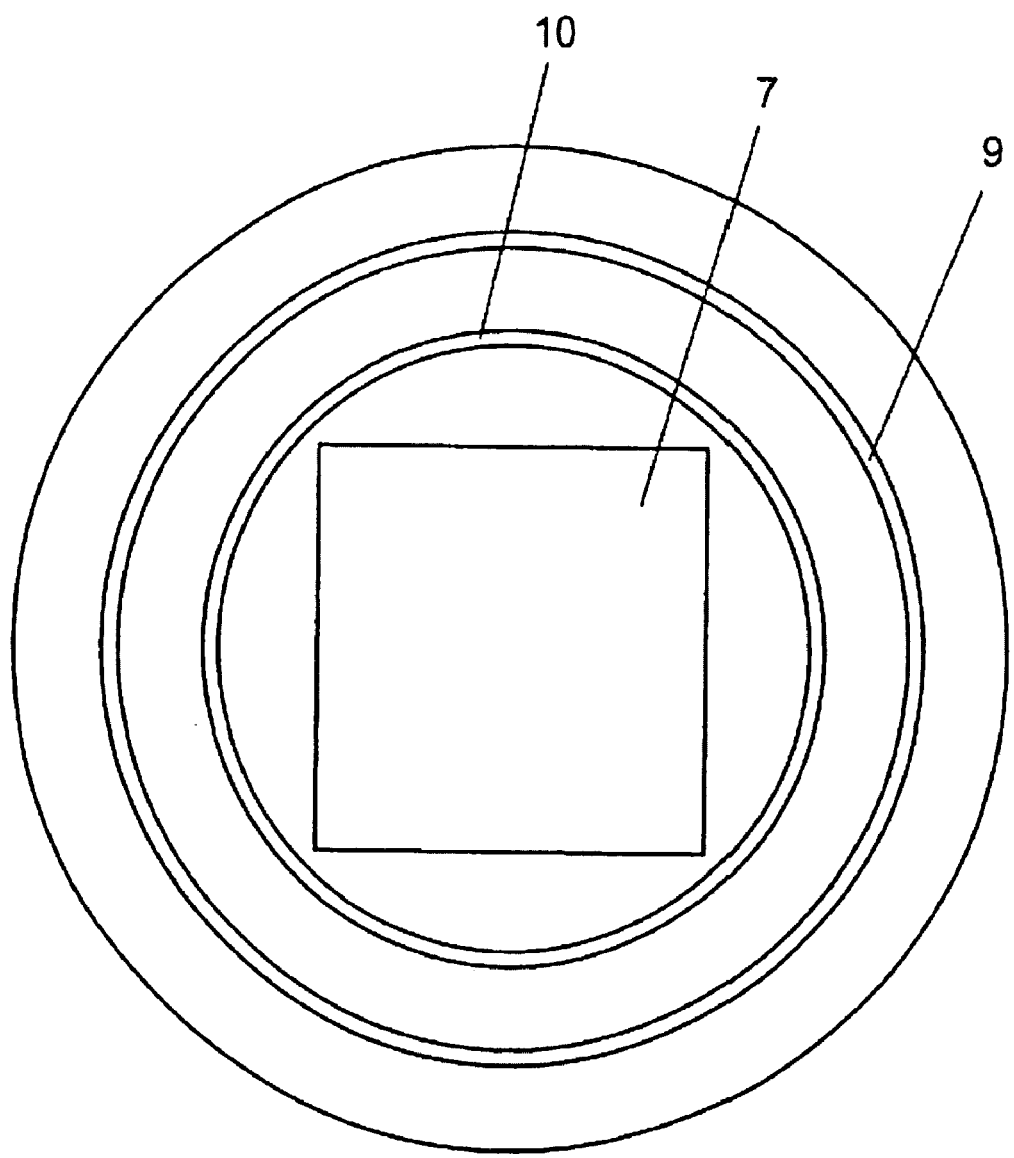
FIG. 6 shows a cross section view taken along line A-A in FIG. 5, of the wind power installation of FIG. 5, according to one embodiment of aspects of the invention.

FIG. 5 shows a side view of a wind power installation 12 according to one embodiment of aspects of the invention with a pylon 9. FIG. 6 shows a section taken along line A-A in FIG. 5. In this respect it can be seen from FIG. 6 that an enclosing housing 10 is disposed between the power module 7 and the pylon wall, which housing 10 can also be a tube.

FIG. 7 shows a view in longitudinal section through the pylon region. It can be seen in this respect that once again the enclosing housing 10 completely screens the power module 7 from the pylon wall 9. For cooling the power module, the air within the enclosing housing is caused to flow by way of a fan 11 into an air cooling duct 12 and that air duct 12 is in part mounted directly to the pylon wall 9 so that in particular there the heated air can be cooled down and can then flow back again into the enclosing housing 10. It is apparent that the air cooling ducts can assume any shape and in particular can also be passed in a spiral configuration along the pylon wall 9 in order in that way to provide for optimum cooling of the air within the air duct 12.

Figure 8:
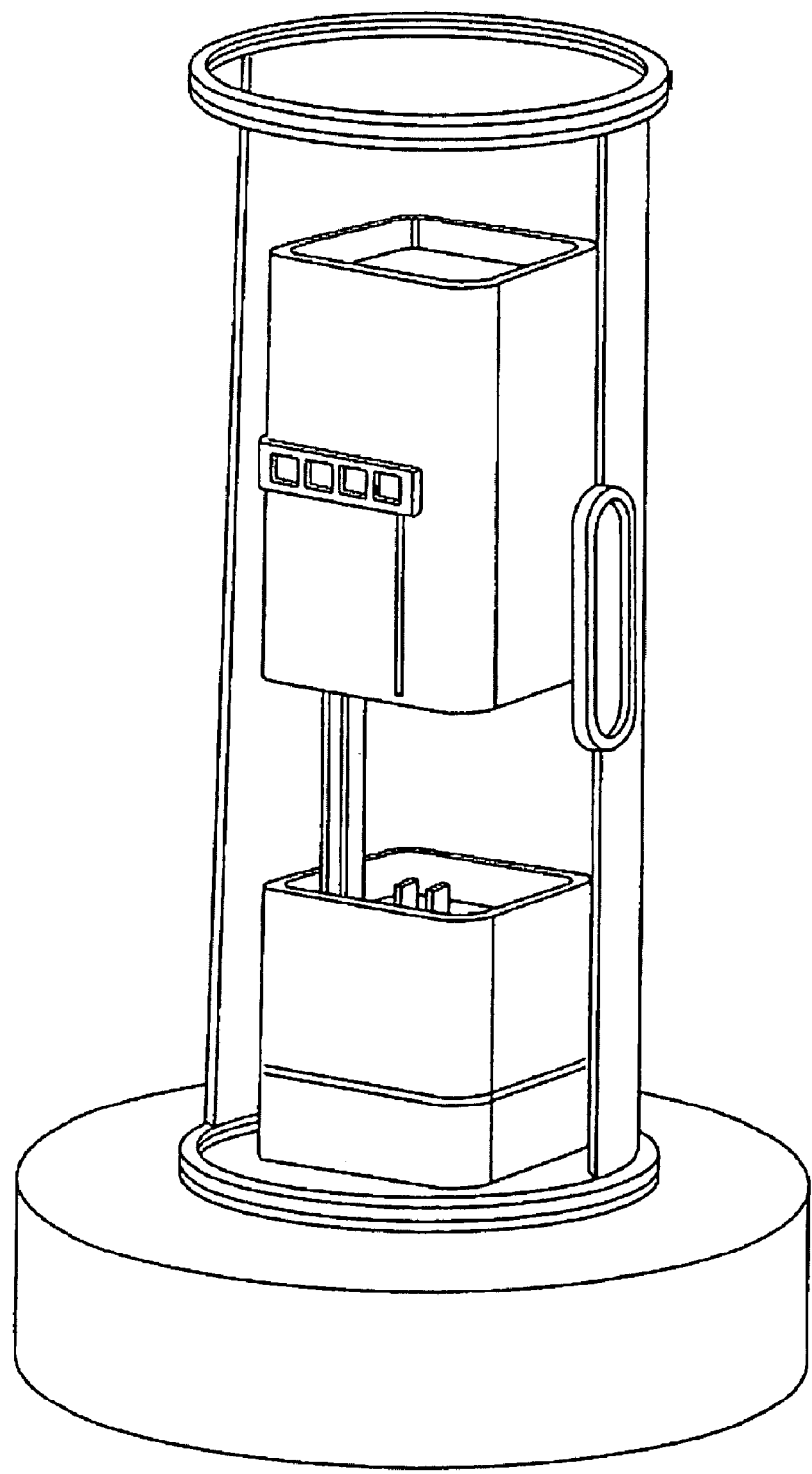
FIG. 8 shows a cut-away view of a wind power installation according to one embodiment of aspects of the invention.

FIG. 8 shows a cut-away view of a wind power installation according to one embodiment of aspects of the invention, from which it can be seen that various parts of the wind power installation are disposed on different levels within an enclosing housing.

Figure 9:
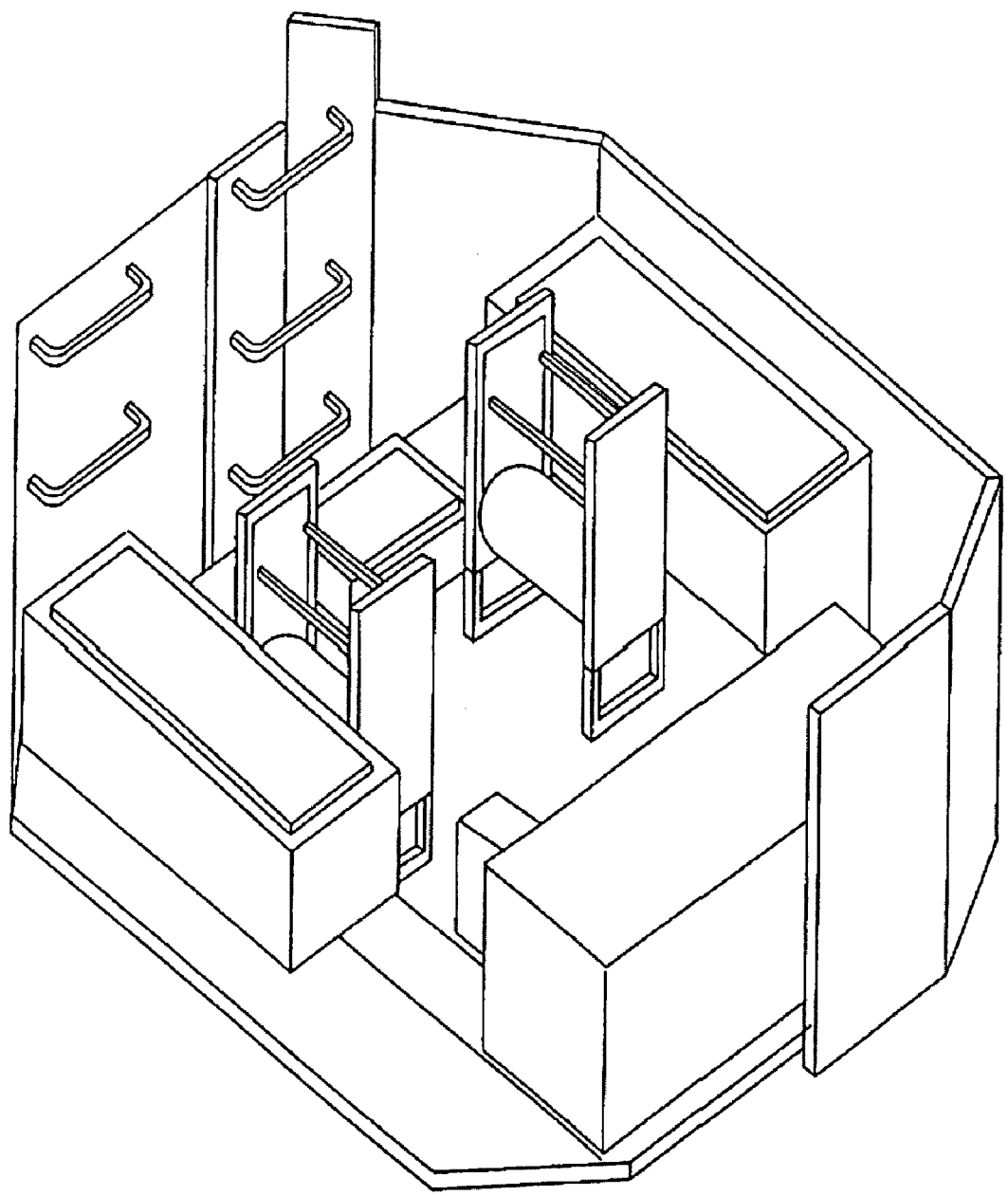
FIG. 9 shows a partly cut-away view of one level of the wind power installation of FIG. 8, according to one embodiment of aspects of the invention.

FIG. 9 shows a partly cut-away plan view of one of the levels shown in FIG. 8. FIG. 9 shows a plan view (in partly cut-away form) on to the entry level (third level) at which there are disposed a control cabinet, a control desk, a DUV desk and so forth. The floor panels laid there can be removed in order to convey parts which are below that level into the third level and thus also into the entry and exit level. Under some circumstances that is important when for example a part has to be moved up from the first and second level to the third level by means of a crane in order then to be conveyed outwardly by way of the entrance of the wind power installation.

Figure 11:
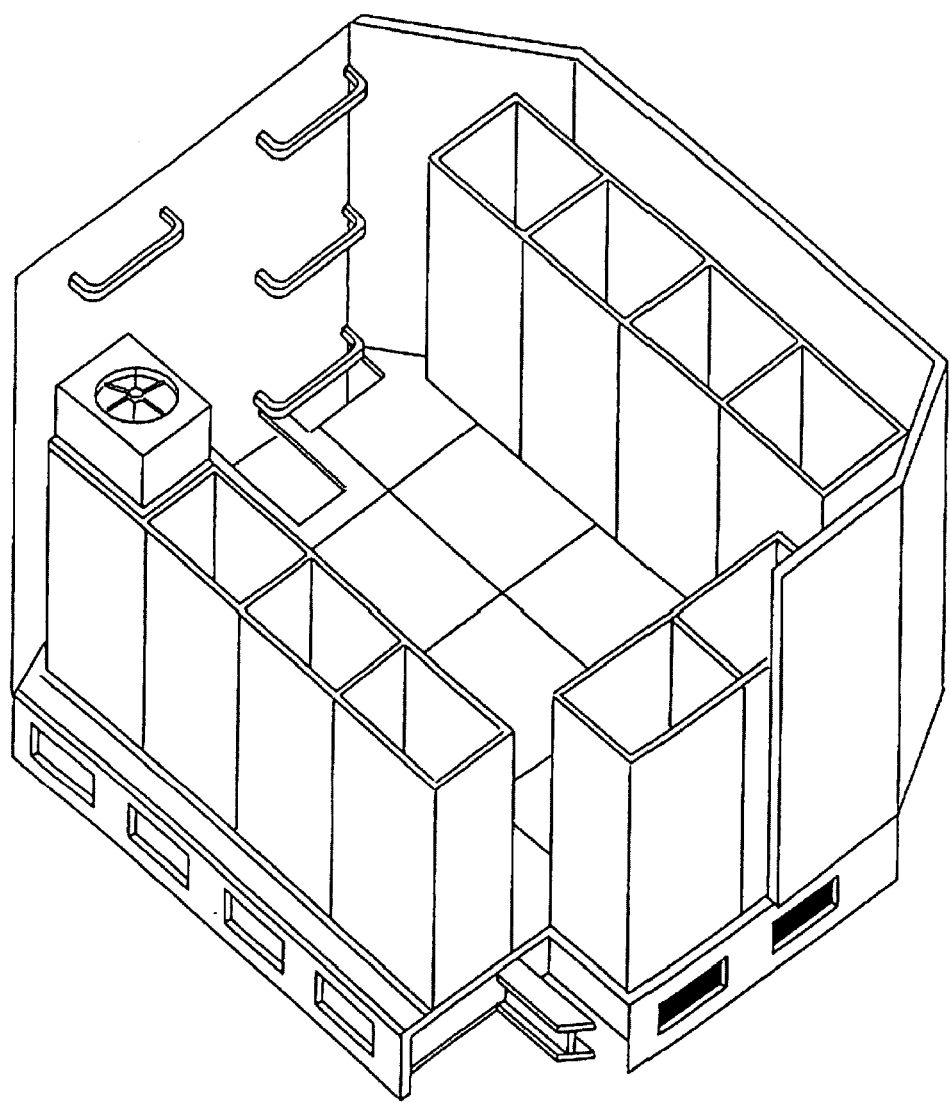
FIG. 11 shows a partly cut-away view of a power cabinet level of the wind power installation of FIG. 8, according to one embodiment of aspects of the invention.

FIG. 11 shows a partly cut-away view of a power cabinet level. Such power cabinet levels can also be provided at a plurality of levels, for example at the 4th, 5th, 6th and 7th levels, because, in the case of relatively large installations, a plurality of power cabinets are usually required and under some circumstances not all of them can be disposed in one level. In that respect it is also to be noted that provided at each level are wall openings for used air so that used air can be discharged through collecting ducts and can be passed into the pylon of the wind power installation where the air is then cooled by heat exchange with the pylon wall.

If the enclosing housing is closed it is also possible for the air pressure within the enclosing housing to be different from the air pressure outside that housing and in particular also the air pressure outside the enclosing housing but within the pylon.

Finally it can also be provided that a heating and/or cooling device is disposed within the enclosing housing and/or in one of the air ducts so that it is possible to influence the temperature within the enclosing housing. A heating device is appropriate under some circumstances when the installation—for whatever reasons—has stopped for a prolonged period of time and in winter cools down to temperatures which are undesirable. On the other hand, cooling of the air within the enclosing housing can be very effectively and quickly effected with a cooling device (for example a heat exchanger).

Finally it is advantageous if the entire enclosing housing is in the form of a self-supporting arrangement so that the entire enclosing housing can be transported and in particular moved on a crane, with the devices disposed in the enclosing housing. Particularly if the enclosing housing is a tube (for example of steel), such a design configuration is readily possible. The advantage of that design configuration is in particular that then the entire enclosing housing, together with all parts therein, can be produced at the factory and thus with the highest level of quality and then only still remains to be transported to the location at which it is to be erected.

The above-indicated structure can also considerably facilitate possible later dismantling.

FIGS. 12 to 16 show further details of a wind power installation according to one embodiment of aspects of the invention with the power module already described above. In this respect the description explains in particular how a lock arrangement is provided between the external entrance to the pylon of the wind power installation and the interior of the installation, that is to say where the important electronic and electrical parts of the power module are disposed, which lock arrangement, in the situation where the entire wind power installation is used as an offshore wind power installation, prevents salt-bearing air or salt water from being capable of passing into the interior of the installation and thus damaging or destroying electrical or electronic parts.

Figure 15:
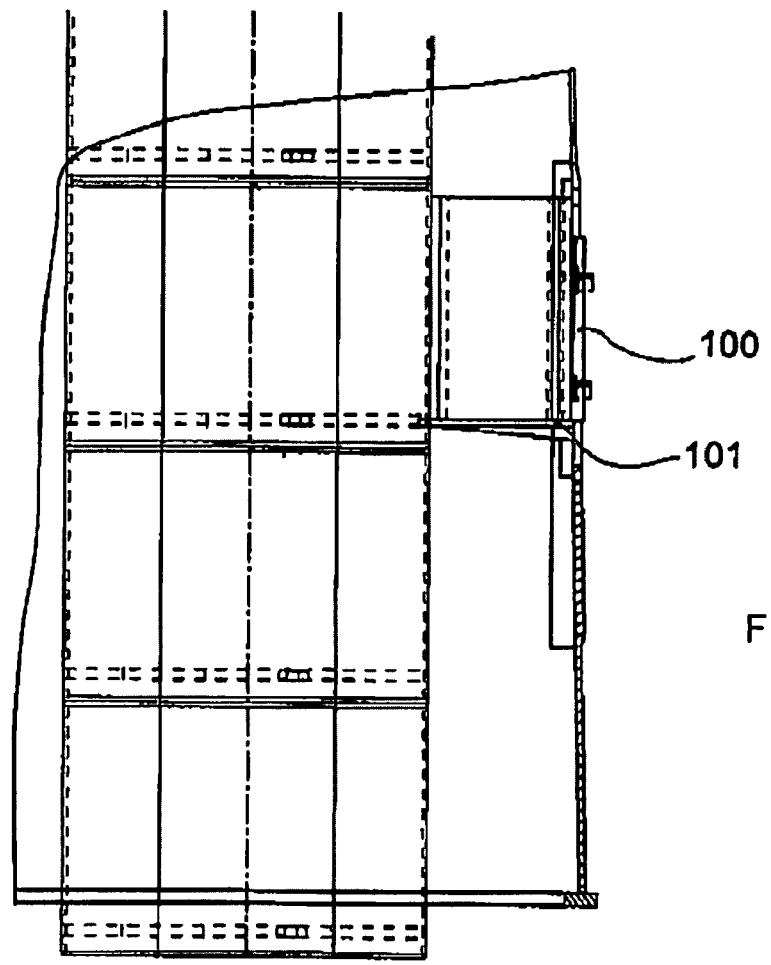

FIG. 15 shows in a partial longitudinal section of the lower pylon, various levels to which the power module is distributed under certain circumstances and, at top right in FIG. 15, the external entrance to the interior of the pylon. That entrance is usually a gate or door which is respectively closable. As can already be seen from FIG. 15, a platform 101 extends from that door 100 inwardly substantially perpendicularly to the pylon wall, the platform 101 preferably being connected directly to the pylon so that the platform can already be walked upon when the pylon is set up.

Figure 16:
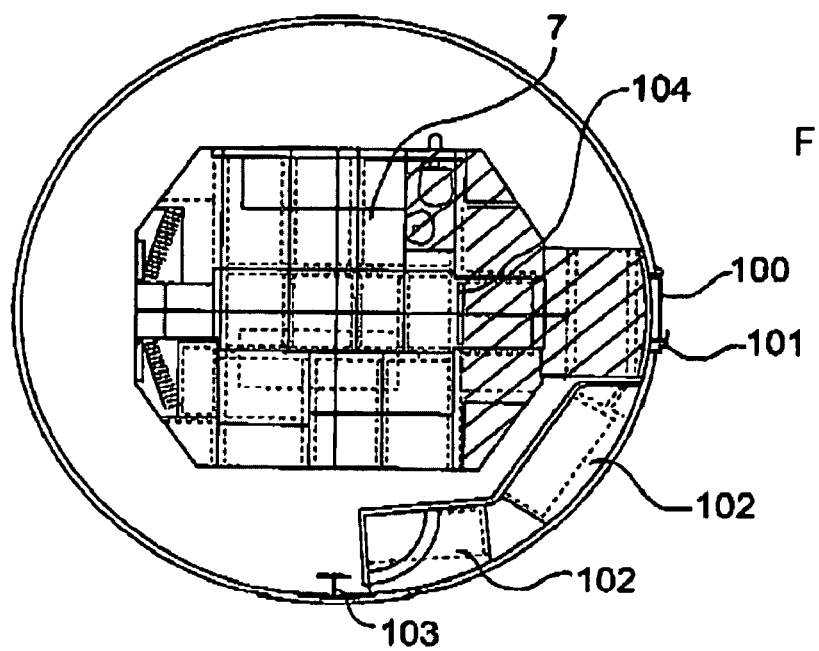
Figure 17:
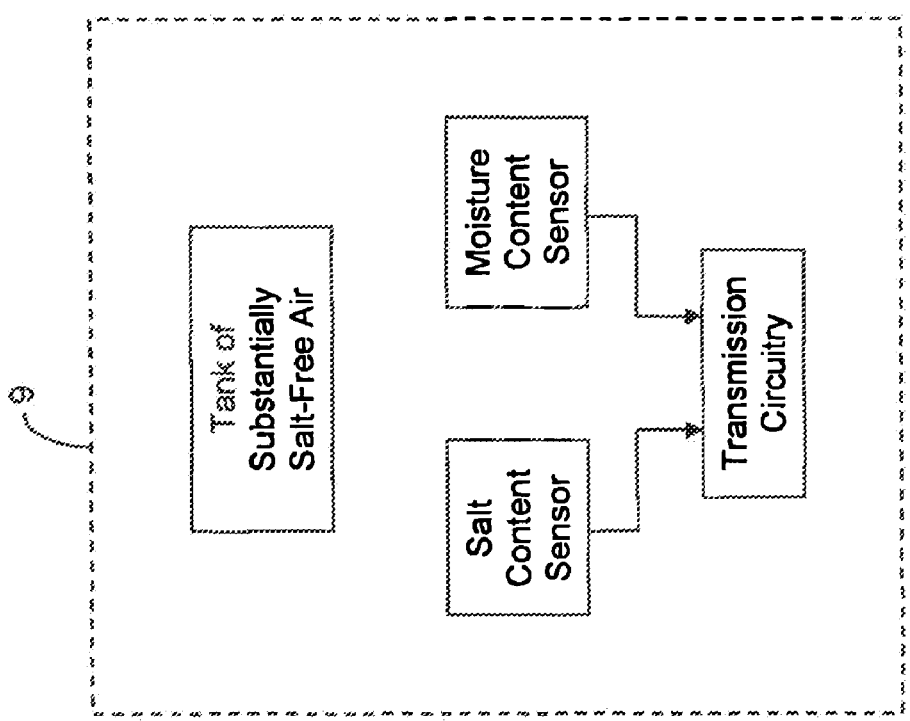
FIG. 17 show a block diagram of a wind power installation, in conjunction with a moisture sensor, salinity sensor and transmission circuitry, according to one embodiment of aspects of the inventions.

FIG. 16 shows a view from above of the structure shown in FIG. 15, illustrating the tube module 7 as well as the door 100 and the platform 101. Laterally in relation to the platform there are further platforms, preferably gratings, which are also fixedly mounted to the pylon wall and which make it possible for a person to go to the ladder 103 provided in the pylon, through the door 100, by way of the above-described platforms 101, 102, when already at a very early stage after construction of the wind power installation.

Figure 10:
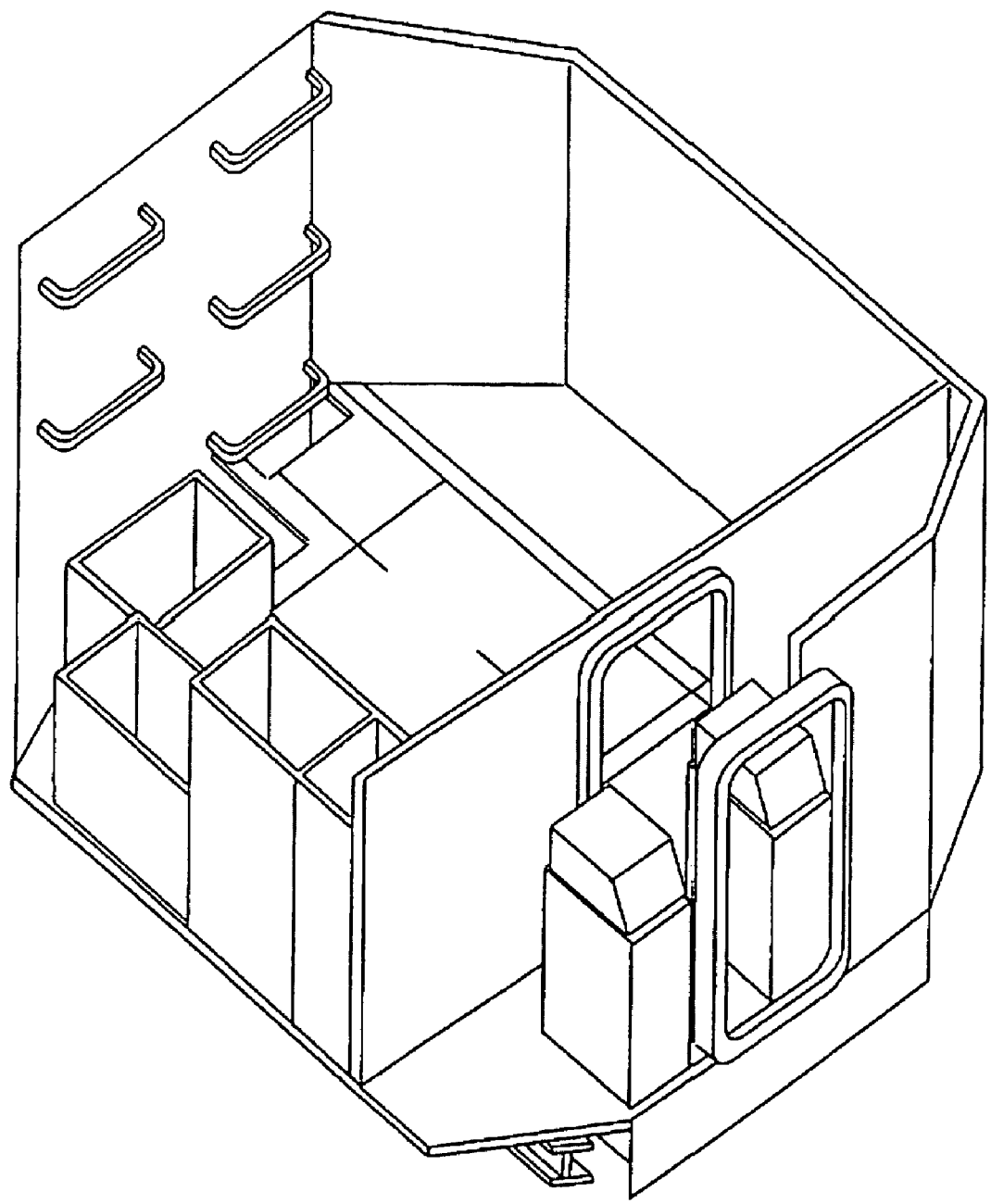
FIG. 10 shows a partly cut-away view of one level of the wind power installation of FIG. 8, according to one embodiment of aspects of the invention.

As can also be seen from the plan view but also from FIG. 15, disposed directly adjoining the platform 101 towards the interior of the pylon is a space (see also in this respect FIG. 10, the bottom right part thereof which possibly together with the space which is above the platform 101 forms a closed lock arrangement. The area of that lock space is shown by hatching in FIG. 16.

Operating personnel pass into that lock space from the exterior and in that space can possibly change clothing or at least stay for a short time. Sanitary equipment is also provided therein. In that lock space there is a further door 104 which leads to the interior of the pylon, that is to say to the items of equipment of the power module.

That door 104 is preferably moisture-tight so that when under some circumstances moisture passes into the lock space, it cannot penetrate into the interior of the installation through the door 104.

FIG. 12 shows a view from the exterior on to the entrance door 100 of the wind power installation.

FIG. 13 shows once again a portion on an enlarged scale viewing into the lock entrance space of FIG. 16.

FIG. 14 shows a further detail view from FIG. 15. It can be clearly seen therein that the floor of the lock entrance space is fixed to the pylon interior itself and that floor is preferably moisture-transmitting so that, when spray water or the like passes into the lock entrance space when the entrance door 100 is opened, the spray water or the like can flow away through the floor. Provided beneath the floor which is preferably also in the form of a grating is a water-impervious panel which is inclined outwardly towards the pylon wall. If therefore spray water or also moisture from the clothing of the operating personnel drips off into that space through the grating, that water can flow away directly outwardly again through an opening 105.

As can also be seen from FIG. 16 but also FIGS. 14 and 13 the lock entrance space 101 can be closable by a further door 106. That door which is preferably also moisture-tight and water-tight separates the lock entrance space in relation to the lock central space with the sanitary equipment which has already been described above.

The invention claimed is:

1. A wind power installation comprising:
   a foundation;
   a pylon secured to the foundation;
   a generator;
   a container, wherein the container is disposed within the pylon;
   a transformer to transform electrical energy provided by the generator to a higher voltage, the transformer is disposed in the container;
   a sensor to generate data which is representative of the salt content in air within the pylon and/or within the container; and
   circuitry, coupled to the sensor, to provide data, which is representative of the salt content, to a remote location.

2. The wind power installation of claim 1 wherein the container comprises a tube having a substantially cylindrical cross-section.

3. The wind power installation of claim 1 wherein the container comprises a water-tight container.

4. The wind power installation of claim 3 wherein the transformer is disposed in the water-tight container.

5. The wind power installation of claim 1 wherein the container is fixed directly to at least one wall of the foundation.

6. The wind power installation of claim 1 wherein the container includes a water-tight door.

7. The wind power installation of claim 1 wherein the container includes a space which is equipped to allow a prolonged stay by at least one person.

8. The wind power installation of claim 1 wherein the container includes a space to allow one or more people to change and/or a rest.

9. The wind power installation of claim 1 wherein the container includes sleeping arrangements for one or more people.

10. The wind power installation of claim 1 further including a moisture sensor to generate data which is representative of the moisture content in air within the pylon and/or within the container.

11. The wind power installation of claim 10 wherein the circuitry further provides data which is representative of the moisture content to the remote location.

12. The wind power installation of claim 10 further including means for reducing the moisture content in the air within the pylon and/or within the container.

13. The wind power installation of claim 10 wherein the means is responsive to control signals from the remote location.

14. The wind power installation of claim 10 wherein the means, after activation, removes moisture until the moisture content is below a predetermined value.

15. The wind power installation of claim 10 further including a Peltier element to reduce the moisture content in the air within the pylon and/or within the container.

16. The wind power installation of claim 1 further including means for reducing the salt content in the air within the pylon and/or within the container.

17. The wind power installation of claim 16 wherein the means is responsive to control signals from the remote location.

18. The wind power installation of claim 16 wherein the means, after activation, removes moisture until the moisture content is below a predetermined value.

19. The wind power installation of claim 1 further including a tank having substantially salt-free air stored therein to responsively output the air stored within the pylon and/or within the container to reduce the salt content of the air within the pylon and/or within the container.

20. A wind power installation comprising:
a foundation;
a pylon secured to the foundation;
a generator;
a container, wherein the container is disposed within the pylon;
a transformer to transform electrical energy provided by the generator to a higher voltage, the transformer is disposed in the container;
means for generating data which is representative of the salt content in air within the pylon and/or within the container; and
means for providing data which is representative of the salt content to a remote location.

* * * * *